United States Patent
Strasnick

(12) 
(10) Patent No.: US 6,523,120 B1
(45) Date of Patent: Feb. 18, 2003

(54) LEVEL-BASED NETWORK ACCESS RESTRICTION

(75) Inventor: Steven L. Strasnick, Mountain View, CA (US)

(73) Assignee: RStar Corporation, San Ramon, CA (US)

(*) Notice: Subject to any disclaimer, the term of this patent is extended or adjusted under 35 U.S.C. 154(b) by 0 days.

(21) Appl. No.: 09/430,859

(22) Filed: Oct. 29, 1999

(51) Int. Cl.[7] .............................................. G06F 11/30
(52) U.S. Cl. ................................... 713/201; 707/513
(58) Field of Search ................................. 713/200, 201; 705/51, 52, 59, 67, 76; 709/225, 226, 227, 228, 229, 311, 313; 707/500, 513

(56) References Cited

U.S. PATENT DOCUMENTS

| | | |
|---|---|---|
| 4,677,434 A | 6/1987 | Fascenda |
| 4,745,559 A | 5/1988 | Willis et al. |
| 5,105,184 A | 4/1992 | Pirani et al. |
| 5,131,020 A | 7/1992 | Liebesny et al. |
| 5,321,750 A | 6/1994 | Nadan |
| 5,327,554 A | 7/1994 | Palazzi, III et al. |
| 5,347,632 A | 9/1994 | Filepp et al. |
| 5,379,421 A | 1/1995 | Palazzi, III et al. |
| 5,404,505 A | 4/1995 | Levinson |
| 5,465,401 A | 11/1995 | Thompson |
| 5,512,935 A | 4/1996 | Majeti et al. |
| 5,524,146 A | 6/1996 | Morrisey et al. |
| 5,614,940 A | 3/1997 | Cobbley et al. |
| 5,706,507 A * | 1/1998 | Schloss ...................... 707/104 |
| 5,717,860 A | 2/1998 | Graber et al. |
| 5,748,190 A | 5/1998 | Kjorsvik |
| 5,761,683 A * | 6/1998 | Logan et al. ................ 707/513 |
| 5,781,909 A * | 7/1998 | Logan et al. ................ 707/200 |
| 5,784,564 A * | 7/1998 | Camaisa et al. ............. 709/224 |
| 5,802,299 A * | 9/1998 | Logan et al. ................ 709/218 |
| 5,819,284 A | 10/1998 | Farber et al. |
| 5,996,011 A * | 11/1999 | Humes ......................... 709/225 |
| 6,092,194 A * | 7/2000 | Touboul ....................... 713/200 |

OTHER PUBLICATIONS

"Macworld–Sessions Attended", www.yesnet.yk.ca/schools/selkirk/learning/ downloadsinfoMacworld.pdf,p. 1–7.*

"Child safe searching: America Online 5.0" http://www.searchengines.com/kids/safe_searching_aol.html, p. 1–2.*

Alvarado, "Internet safety and your family" wysiwyg://50/http://family.go.com/raisi...eature/njpp89websafe/njpp89wesafe.html.*

"ANS interlock service 4.0 offers secure managed internet access" Jul. 31, 1996, Business Wire, Dialog Text Search, p. 1–2.*

* cited by examiner

Primary Examiner—Gail Hayes
Assistant Examiner—Christopher Revak
(74) Attorney, Agent, or Firm—Banner & Witcoff, Ltd.

(57) ABSTRACT

Methods and apparatuses for level-based network access restriction are described. A user of network resources logs on to the network according to any appropriate security procedure. The user is provided access to a known, trusted resource as a starting point. From the starting point, the user can access other network resources by following links from the starting point or in another manner. The network resources accessed by the user are analyzed to determined whether the resource is a trusted resource. If the resource is a trusted resource, the user is allowed to follow a predetermined number of links away from the trusted resource before access is denied.

23 Claims, 5 Drawing Sheets

LEVEL-BASED NETWORK ACCESS RESTRICTION

FIELD OF THE INVENTION

The invention relates to network access restrictions. More particularly, the invention relates to methods and apparatuses for limiting the levels of access away from a trusted network resource.

BACKGROUND OF THE INVENTION

In many situations, organizations, such as schools and public libraries, desire to provide network access to many individuals having many different needs. This access is typically the Internet; however, access to other networks can also be provided. In certain environments, such as schools and public libraries, many of the individuals that desire network access are minors, and it is desirable to provide somewhat restricted access to the network (e.g., no access to pornographic World Wide Web sites).

Many schemes have been developed to provide acceptable restricted access to networks. Typical network restriction schemes include user name and password access restriction and/or approved/restricted resource lists. User name and password schemes require a user to provide an authorized user name and password to access network resources (e.g., a World Wide Web page, an audio file, a text document). However, user name and password schemes can be easily defeated if an authorized user provides his/her authorized user name and password to others.

Approved/restricted resource list schemes maintain an approved list and/or a restricted list that list approved network resources and restricted network resources, respectively. In order for a user to have access to a particular network resource, the resource must be included in the approved list and/or not included in the restricted list, depending on how the access scheme is implemented. However, with large, constantly changing networks such as the World Wide Web, maintaining access and/or restricted lists for multiple users generally does not provide a satisfactory network access experience for users and is difficult and time consuming to maintain for network access providers.

What is needed in an improved scheme for restricting access to network resources.

SUMMARY OF THE INVENTION

Methods and apparatuses for level-based network access restriction are described. A browser or other application determines whether an electronic document is a trusted electronic document. Access to further electronic documents is limited to a predetermined number of levels away from the trusted electronic document. In one embodiment, access to the further electronic documents is accomplished via electronic links. Further access is denied if the electronic document is not a trusted electronic document.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Figure 1:
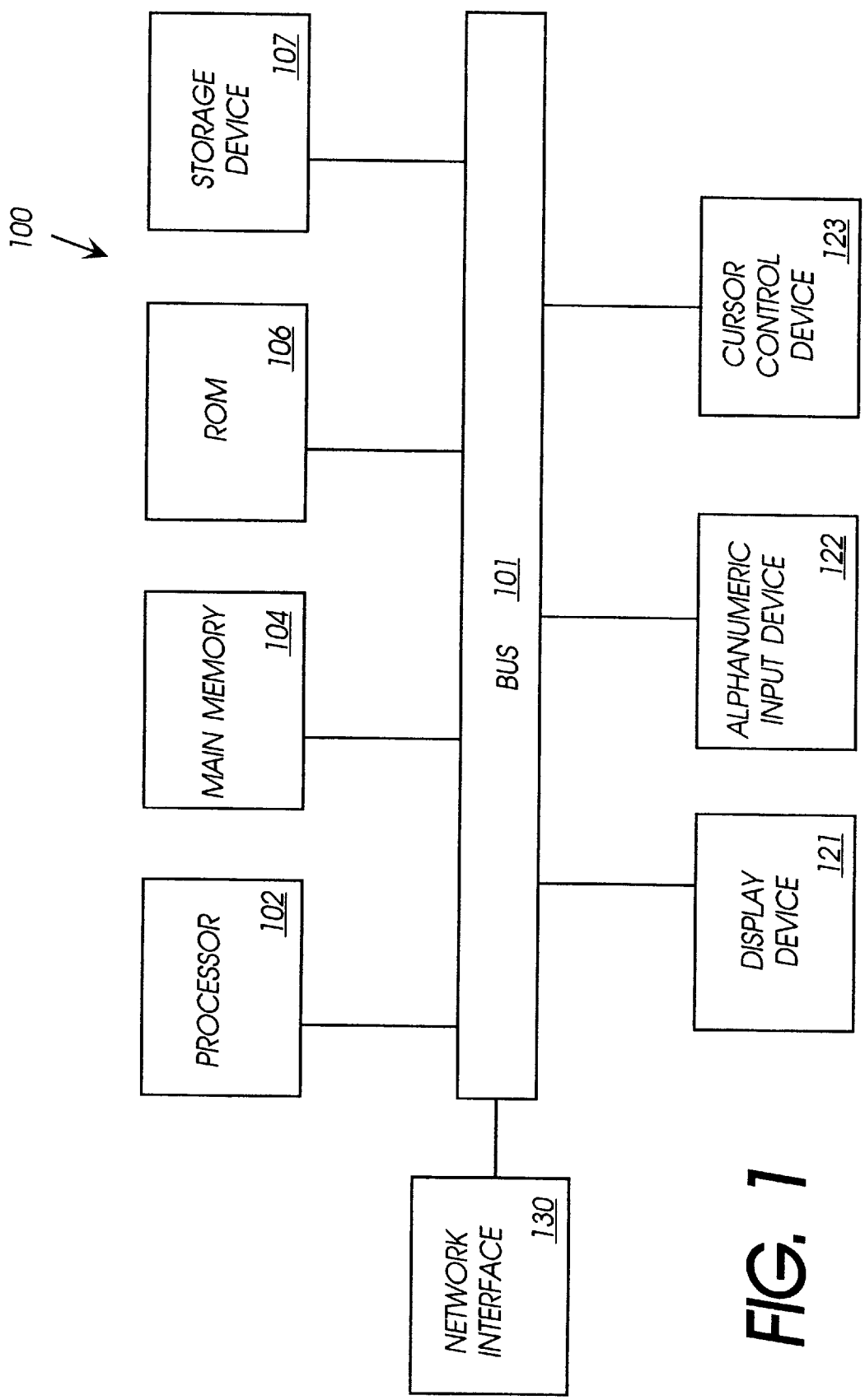
FIG. 1 illustrates one embodiment of a computer system.

Methods and apparatuses for level-based network access restriction are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In general, a user of network resources logs on to a network according to any appropriate security procedure. The user is provided access to a known, trusted resource (e.g., document, file) as a starting point. From the starting point, the user can access other network resources by following links from the starting point or in another manner. The network resources accessed by the user are analyzed to determine whether the resource is a trusted resource. If the resource is a trusted resource, the user is allowed to follow a predetermined number of links away from the trusted resource before access is denied.

FIG. 1 illustrates one embodiment of a computer system. The computer system of FIG. 1 can be used in various capacities with the present invention. For example, the computer system can be a terminal used by a user to access local or remote resources, the computer system can be a server providing remote access to a resource, or the computer system can be a proxy server providing access to remote computer systems.

Computer system 100 includes bus 101 or other communication device for communicating information and processor 102 coupled to bus 101 for processing information. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Computer system 100 further includes network interface 130 to provide access to a network, such as a local area network. One embodiment of the present invention is related to the use of computer system 100 to provide network access having level-based restrictions. According to one embodiment, network access having level-based restrictions is provided by one or more computer systems or other electronic devices in response to one or more processors executing sequences of instructions contained in memory.

Instructions are provided to memory from a storage device, such as magnetic disk, a read-only memory (ROM) integrated circuit, CD-ROM, DVD, via a remote connection (e.g., over a network via network interface 130), etc. In alternative embodiments, hard-wired circuitry can be used in place of or in combination with software instructions to implement the present invention. Thus, the present invention is not limited to any specific combination of hardware circuitry and software instructions.

Figure 2:
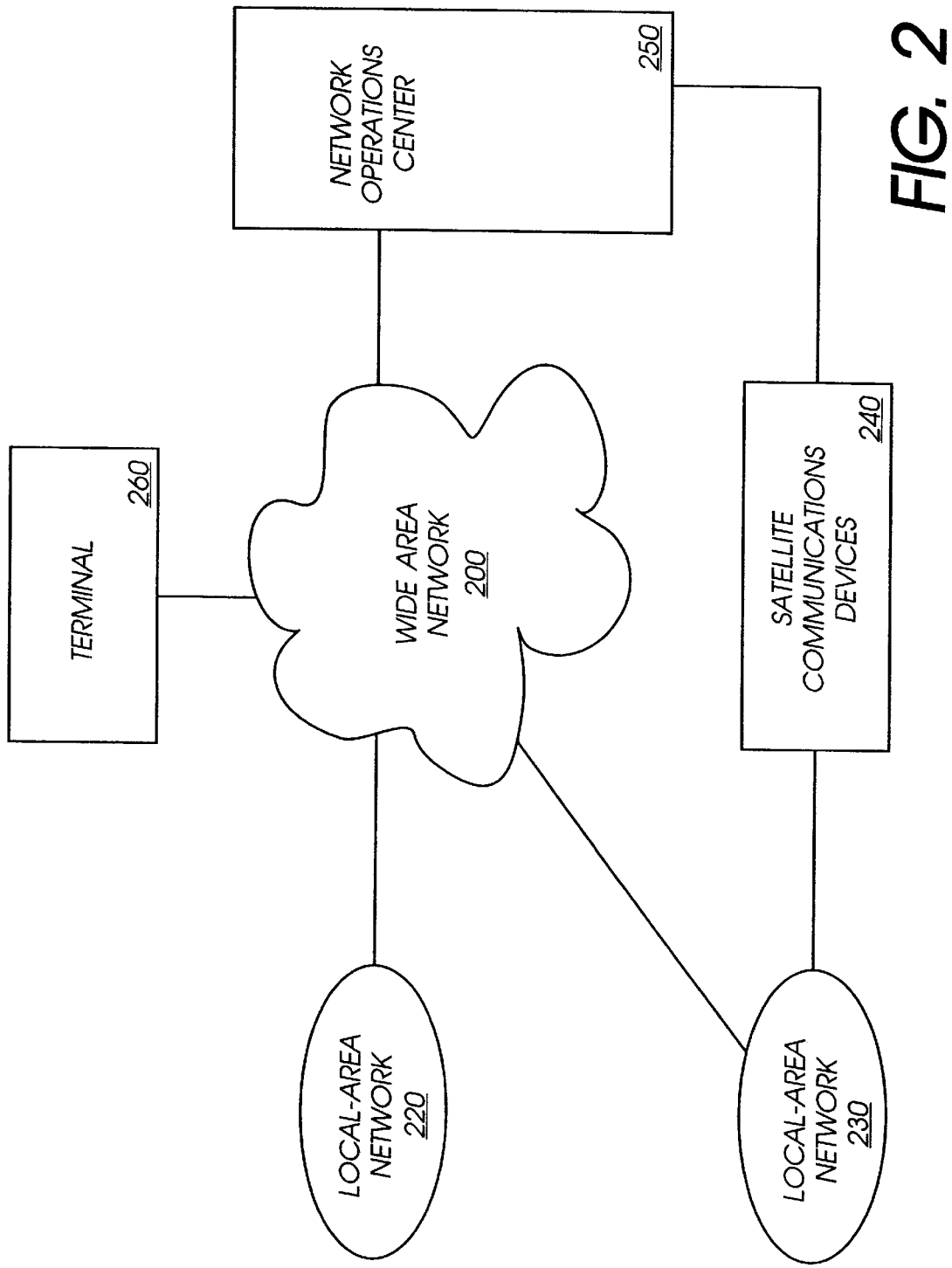
FIG. 2 illustrates one embodiment of a network configuration.

FIG. 2 illustrates one embodiment of a network configuration. The configuration of FIG. 2 is described in terms of both land based communications and satellite communications; however, the manner of communication is not central to the present invention. Therefore, the present invention is applicable to any interconnection of devices that provide access to local and remote resources.

Wide area network 200 provides an interconnection between multiple local area networks (e.g., 220 and 230), individual terminals (e.g., 260) and one or more network operations centers (e.g., 250). In one embodiment, wide area network 200 is the Internet; however, any wide area network (WAN) or other interconnection can be used to implement wide area network 200.

Terminal 260 is an individual terminal that provides access to network resources as well as local resources for a user thereof. In one embodiment, terminal 260 is a personal computer connected to wide area network 200 via a modem, a wireless connection, etc. Alternatively, terminal 260 can be a set-top box such as a Web™ terminal available from Sony Electronics, Inc. of Park Ridge, N. J., or a set-top box using a cable modem to access a network such as the Internet. Similarly, terminal 260 can be a "dumb" terminal or a thin client device such as the ThinSTAR™ available from Network Computing Devices, Inc. of Mountain View, Calif. As another alternative, terminal 260 can be a personal digital assistant (PDA).

Local area network 220 provides an interconnection of devices at a local level. For example, local area network 220 can interconnect multiple computers, printers, and other devices within one or more buildings. Local area network 220 is coupled to wide area network 200. Similarly, local area network 230 provides an interconnection of devices. However, local area network 230 is coupled to satellite communications devices 240 as well as wide area network 200.

Network operations center 250 is coupled to wide area network 200 and provides access to network resources for terminal 260, local area network 220 and local area network 230. Communication between network communications center 250 and either terminal 260 or local area network 220 is accomplished by wide area network 200. As described in greater detail below, network operations center 250 and local area network 230 communicate via wide area network 200 and/or satellite communications devices 240.

In one embodiment network operations center 250 includes multiple servers (not shown in FIG. 2) that provide access to network and other resources. For example, network operations center 250 can include a Web proxy server that provides access to the World Wide Web (WWW, or the Web) for devices of local area network 220, local area network 230 and terminal 260. Network operations center 250 can also include other devices, such as a middleware server or a file server that provide information to devices coupled to network operations center 250.

In one embodiment, information is communicated between network operations center 250 and local area network 230 via uni-cast, multicast or broadcast satellite communications devices 240, which includes necessary components to provide communications between network operations center 250 and local area network 230. In one embodiment, satellite communication are accomplished using Transmission Control Protocol/Internet Protocol (TCP/IP) embedded within a digital video broadcast (DVB) stream; however, alternative communication protocols can be used. In one embodiment, satellite communications are bi-directional. Alternatively, if satellite communications are uni-directional, wide area network 200 can be used to provide a hybrid, asymmetric bi-directional communications system such as the SkySurfer™ platform available from Gilat Satellite Networks, Inc. of McLean, Va.

Figure 3:
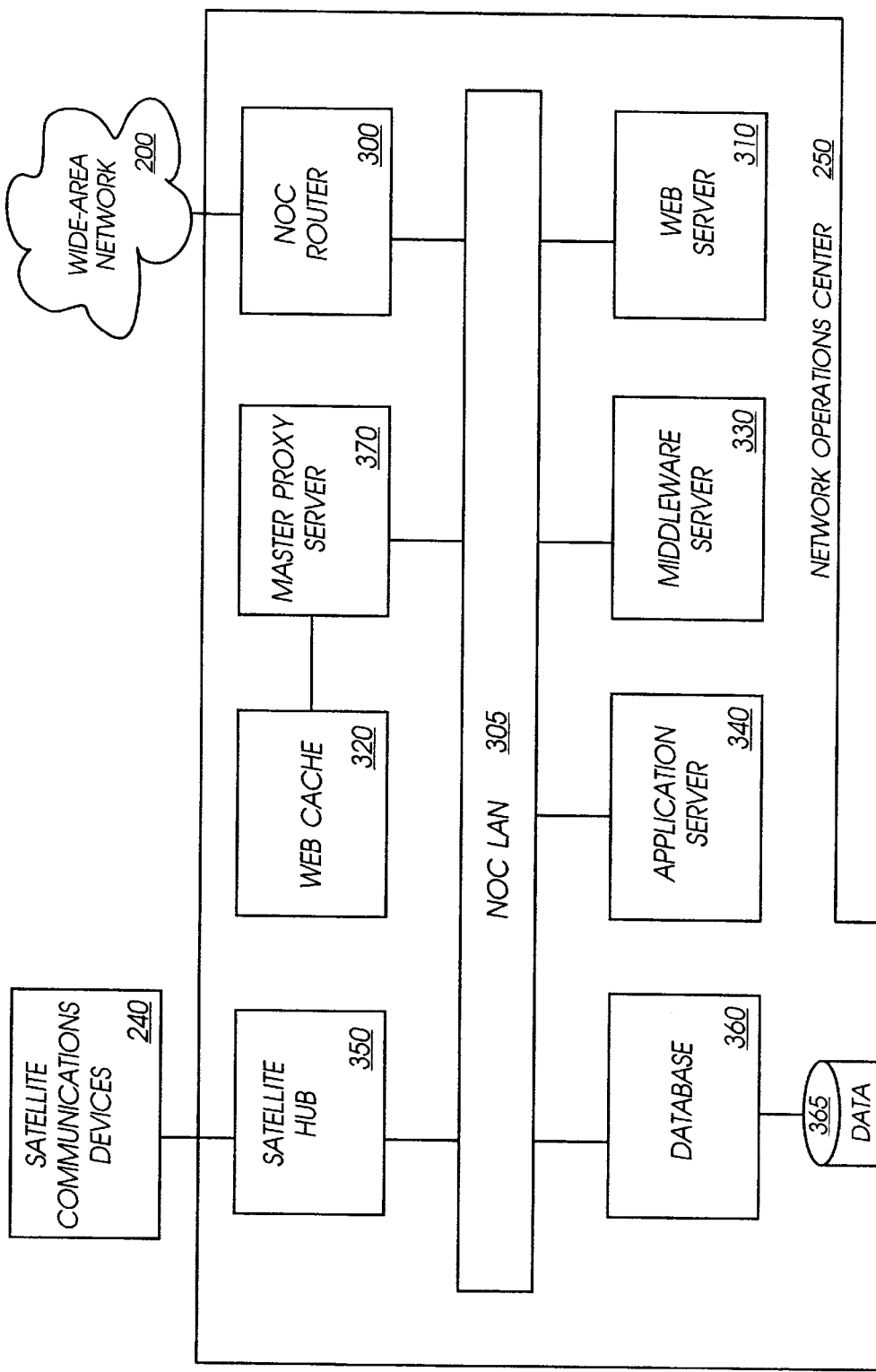
FIG. 3 illustrates one embodiment of a network operations center coupled to a network.

FIG. 3 illustrates one embodiment of a network operations center coupled to a network. With respect to description of FIG. 3, wide area network 200 and satellite communications devices 240 are implemented as described above in FIG. 2. Notwithstanding being described as including certain types of servers and other devices, network operations center 250 can include different or additional components as well as multiple components, for example, multiple Web servers. Each server can be one or more software and/or hardware components.

Network operations center (NOC) 250 provides resources to local area networks and individual terminals (not shown in FIG. 3) as well as a gateway to a larger network such as the Internet. Thus, network operations center 250 can be used to provide a controlled set of resources while being part of a larger network. This is particularly advantageous in situations where users of the local area networks are somewhat homogenous. For example, students in similar grade levels, professionals, and other groups.

Additional uses and details of the network of FIG. 2 and the network operations center of FIG. 3 can be found in U.S. Pat. application No. 09/216,016, entitled "OPTIMIZING BANDWIDTH CONSUMPTION FOR DOCUMENT DISTRIBUTION OVER A MULTICAST ENABLED WIDE AREA NETWORK" and U.S. Pat. application No. 09/216,018, entitled "A METHOD AND APPARATUS FOR SUPPORTING A MULTICAST RESPONSE TO A UNICAST REQUEST FOR DATA," both of which are assigned to the corporate assignee of the invention.

NOC router 300 is coupled to NOC LAN 305 and provides routing and firewall functionality for the servers and other components of network operations center 250. NOC router 300 can be implemented in any manner known in the art. In one embodiment, database 360 is coupled to NOC LAN 305. Database 360 can be used, for example, to store information about authorized users of associated local area networks, or to store information about resources that are available on each terminal connected to the network.

Database 360 can also be used to store statistics about network usage, advertisement media assets to be downloaded to devices of the local area networks, etc. In one embodiment database 360 is used to store user profile information for authorized users of the network. Data store 365 represents data stored by database 360 and can be one or more physical devices and logical data tables.

Master proxy server 370 is also coupled to NOC LAN 305 to provide World Wide Web resources to devices of the connected local area network(s) or individual terminals. In one embodiment web server 310 is a Hypertext Markup Language (HTML) and/or Secure Sockets Layer (SSL) server. Of course, Web server 310 can be another type of (e.g. FTP, multicast "carousel" data broadcast server, reliable file multicast server, UNIX host, media server, etc.). Web cache 320 is used to store Web resources (e.g., Web pages) that are most often accessed, most recently accessed, etc. In one embodiment, Web cache 320 stores a predetermined set of Web resources that are provided to the local area networks. In a school network environment, the cached Web resources can be, for example, a preapproved set of Web pages. In one embodiment all or a portion of the contents of Web cache 320 are replicated on local networks.

Middleware server 330 manages database applications and interfaces with other servers in network operations center 250. For example, middleware server 330 can determine which users have access to Web server 310 and grant access accordingly. Middleware server 330 can also dynamically generate a Web page, graphic or chart based on database content. In addition, middleware server 330 can acquire and process/evaluate data from a plurality of database servers and logical databases.

Middleware server 330 can also be replicated on local area networks, such as local area networks 220 and 230 of FIG. 2. Middleware server 330 can be executed in any sufficient manner known to the art, for example, WebObjects® available from Apple Computer, Inc. of Cupertino, Calif., or a similar database middleware product. Alternatively, each client and server can act as its own middleware device by interfacing with the database servers on their own behalf though existing database interfacing technologies such as the Common Object Request Broker Architecture (CORBA) as defined by Object Management Group, Inc. of Framingham, Mass. or COM+available from Microsoft Corporation of Richmond, Wash.

Application server 340 provides applications programs to devices coupled to network operations center 250. Application server 340 conceptually represents two different types of servers. Application server 340 can be part of a client-server architecture where the server provides data to a client (e.g., HTML server, e-mail server, bulletin board server). Application server 340 can also be a software distribution and management server for "stand alone" programs. Master proxy server 370 provides World Wide Web access to devices coupled to network operations center 250. Master proxy server 370 can be implemented in any manner known in the art.

Figure 4:
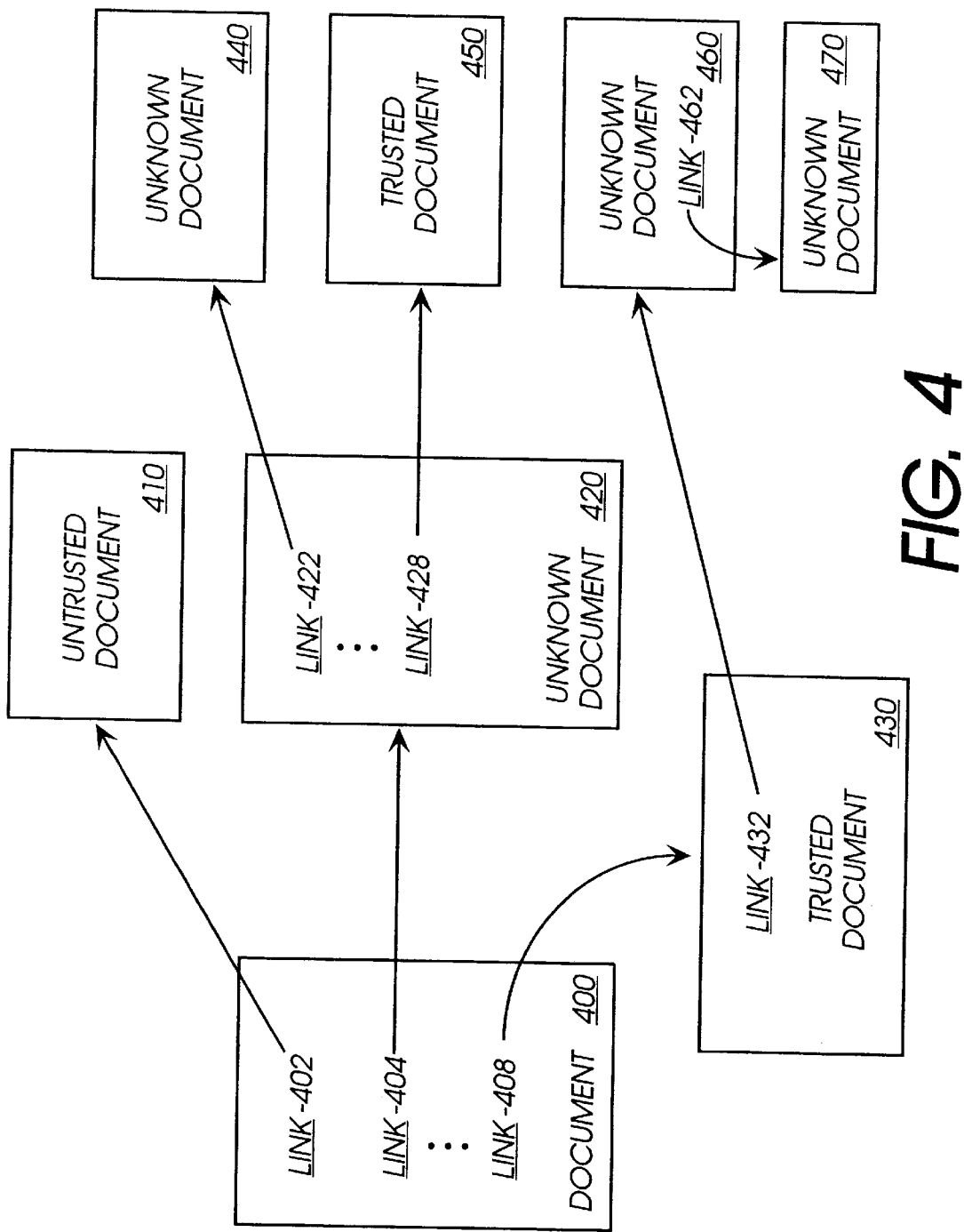
FIG. 4 is a conceptual block diagram of electronic documents having links to further electronic documents.

FIG. 4 is a conceptual block diagram of electronic documents having links to further electronic documents. The example of FIG. 4 is described in terms of documents; however, access restrictions to any network resources can be provided as described herein. The documents of FIG. 4 can be in any appropriate format, for example, Hypertext Markup Language (HTML), extensible Hypertext Markup Language (XHTML), extensible markup language (XML), Virtual Reality Markup Language (VRML), etc. Also, the documents of FIG. 4 can be multiple pages from a single Web site. For example, an index page may be trusted, but other pages of the same Web site may not be designated as trusted documents.

Document 400 provides a starting point for network access. In one embodiment, all users are provided a trusted document as a starting point for network access. Document 400 can be accessed, for example, by a browser application running on a computer system. The trusted document may be different for different users. In one embodiment, document 400 is an index document that provides links to other documents. For example, document 400 can have an index of links to documents on approved or appropriate material, determined based on, for example, information known (e.g., age, location, time of day) about the user, the environment and/or the purpose of the network access.

In one embodiment, all users of a particular local network are provided the same starting document that can be used to access a larger network. For example, in a school environment, the school can have a private local network to which student computers are connected. The students can access other networks, for example, the Internet, with the computers. When the students log on the local network a known, trusted document (e.g., a school-provided index page) is provided as a starting point for navigation.

Document 400 includes one or more electronic links (e.g., link 402, link 404, link 408). The links can point to trusted documents, unknown documents and/or untrusted documents. The list of untrusted documents is not necessary, but may be useful in preventing access to documents that would otherwise be accessible. In one embodiment, a list of trusted documents and/or a list of untrusted documents is maintained. In alternative embodiments, the browser application analyzes a document to determine whether the document should be trusted.

In the example of FIG. 4, link 402 points to untrusted document 410. If an untrusted document list is maintained, access to untrusted document 410 is denied. If an untrusted document list is not maintained, access to untrusted document 410 is granted if the user is allowed to access documents linked to document 400 and untrusted document 410 is within the predetermined number of allowed levels away from a trusted document.

In one embodiment, the browser application running on the user's computer system tracks the status of documents accessed and allows or denies access to linked documents based on a predetermined number of levels away from a trusted document the user is allowed to access. In alternate embodiments, other applications, for example, a middleware server in a NOC (not shown in FIG. 4) can be used to allow or deny access to documents. In one embodiment, the browser application allows or denies access to electronic documents based on information (e.g., a trusted document list) retrieved from the NOC.

In one embodiment, a user is allowed to follow links one level away from trusted documents. In such an embodiment, untrusted document 410 is accessible to the user, but no links (not shown in FIG. 4) included in untrusted document 410 can be followed. In an alternate embodiment, a user is allowed to follow links two levels away from trusted documents. In such an embodiment, the user can follow links from untrusted document 410 to another document (not shown in FIG. 4), but no links from the second document. Any number of levels can be used; however, the greater the number of levels allowed, the less restrictive the network access becomes.

Link 404 points to unknown document 420. If the user is limited to one level away from a trusted document, the links (e.g., link 422 and link 428) to unknown document 440 and trusted document 450 from unknown document 420 are denied. If multiple levels are allowed, the link to unknown document 440 can be followed as described above. The link to trusted document 450 can also be followed. Because document 450 is trusted, the predetermined number of levels allowed to the user are reset and the user can follow the predetermined number of levels away from trusted document 450.

In the example of FIG. 4, document 400 also includes link 408 to trusted document 430. Because the link takes the user from one trusted document to another, the user is allowed to follow the predetermined number of levels away from trusted document 430. For example, the user can follow link 432 to unknown document 460. If multiple levels are allowed, the user can follow link 462 from unknown document 460 to unknown document 470.

Figure 5:
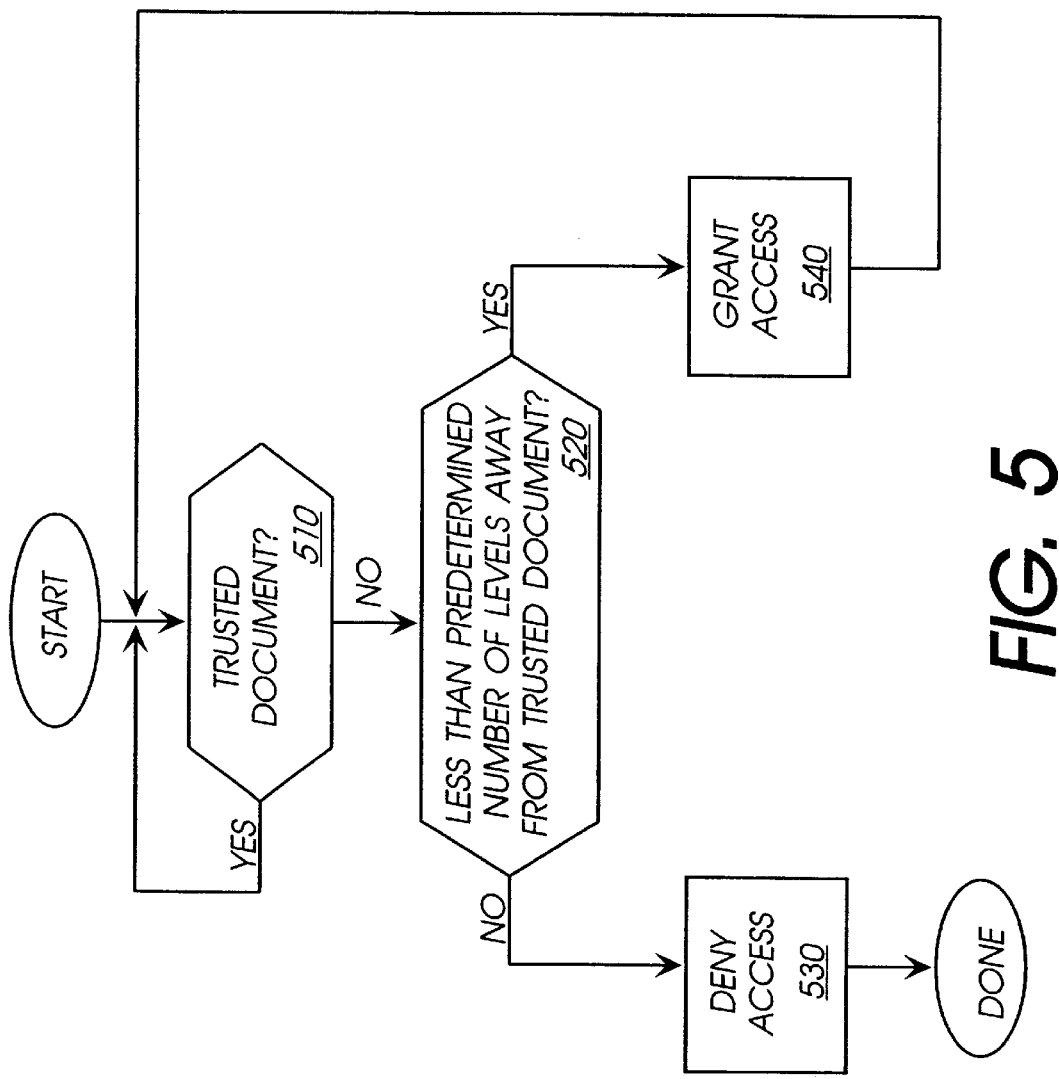
FIG. 5 is a flow diagram of one embodiment of level-based network access restrictions.

FIG. 5 is a flow diagram of one embodiment of level-based network access restrictions. Access to trusted documents is granted at 510. Access restrictions are not imposed on a user if the user is accessing only trusted documents. In one embodiment, a browser application determines whether a document is a trusted document; however, other applications can determine whether a document is a trusted document.

If a document is not a trusted document at 510, the browser determines whether the document is less than a predetermined levels away from a trusted document at 520. If not, access is denied at 530. If the document is less than the predetermined number of levels away from a trusted document at 520, access is granted to the requested document at 540. The process of 510, 520, 530 and 540 is repeated for subsequent documents.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

determining whether an electronic resource is a trusted electronic resource;

limiting access to further electronic resources to a predetermined multiple number of levels away from the trusted electronic resource, wherein access to the further electronic resources is accomplished via electronic links; and deny access to the further electronic resources if the electronic resource is not a trusted electronic resource.

2. The method of claim 1 wherein the electronic resource comprises a World Wide Web page.

3. The method of claim 1 wherein the electronic resource comprises a Hypertext Markup Language (HTML) document.

4. The method of claim 1 wherein the electronic resource comprises a Virtual Reality Markup Language (VRML) document.

5. The method of claim 1 wherein the trusted electronic resource is an index document.

6. The method of claim 1 wherein the predetermined number of levels away from the trusted resource comprises following an electronic link to a second resource having additional electronic links, wherein following the additional electronic links from the second resource is prohibited.

7. The method of claim 1 wherein the predetermined number of levels away from the trusted electronic resource comprises following an electronic link to a second electronic resource having additional electronic links and following one of the links from the second resource to a third resource, wherein following the additional electronic links from the third resource is prohibited.

8. A machine-readable medium having stored thereon sequences on instructions that when executed cause one or more electronic devices to:

determine whether an electronic resource is a trusted electronic resource;

limit access to further electronic resources to a predetermined multiple number of levels away from the trusted electronic resource, wherein access to the further electronic resources is accomplished via electronic links; and deny access to the further electronic resources if the electronic resource is not a trusted electronic resource.

9. The machine-readable medium of claim 8 wherein the electronic resource comprises a World Wide Web page.

10. The machine-readable medium of claim 8 wherein the electronic resource comprises a Hypertext Markup Language (HTML) document.

11. The machine-readable medium of claim 8 wherein the electronic resource comprises a Virtual Reality Markup Language (VRML) document.

12. The machine-readable medium of claim 8 wherein the trusted electronic resource is an index document.

13. The machine-readable medium of claim 8 wherein the predetermined number of levels away from the trusted resource comprises following an electronic link to a second resource having additional electronic links, wherein following the additional electronic links from the second resource is prohibited.

14. The machine-readable medium of claim 8 wherein the predetermined number of levels away from the trusted electronic resource comprises following an electronic link to a second electronic resource having additional electronic links and following one of the links from the second resource to a third resource, wherein following the additional electronic links from the third resource is prohibited.

15. An apparatus comprising:

means for determining whether an electronic resource is a trusted electronic resource;

means for limiting access to further electronic resources to a predetermined multiple number of levels away from the trusted electronic resource, wherein access to the further electronic resources is accomplished via electronic links; and means for denying access to the further electronic resources if the electronic resource is not a trusted electronic resource.

16. The apparatus of claim 15 wherein the predetermined number of levels away from the trusted resource comprises following an electronic link to a second resource having additional electronic links, wherein following the additional electronic links from the second resource is prohibited.

17. The method of claim 15 wherein the predetermined number of levels away from the trusted electronic resource comprises following an electronic link to a second electronic resource having additional electronic links and following one of the links from the second resource to a third resource, wherein following the additional electronic links from the third resource is prohibited.

18. A network comprising:

a first device to store electronic resources having links; and a second device coupled to the first device, the second device executing a browser application to access electronic resources, wherein the browser determines a trusted status of an electronic resource to be accessed, and further wherein the browser limits access to further electronic resources to a predetermined multiple number of levels away from a trusted electronic resource.

19. The network of claim 18 further comprising a third device to store electronic resources having links, the third device coupled to the first device and to the second device, wherein at least one of the links in the electronic resources of the first device indicate one of the electronic resources of the third device, and further wherein the browser limits access to the trusted electronic resource of the first device and to the electronic resources of the third device indicated by the links in the electronic resources of the first device.

20. The network of claim 18 further comprising:

a third device coupled to the first device and to the second device, the third device to store electronic resources having links, wherein one of the links in the electronic resources of the first device indicates one of the electronic resources of the third device; and a fourth device coupled to the second device and to the third device, the fourth device to store electronic resources, wherein one of the links in the resources of the third device indicates one of the electronic resources of the fourth device, and further wherein the browser limits access to the trusted electronic resource of the first device, to the electronic resource linked to the trusted electronic resource of the first device, and to the electronic resource of the fourth device linked to the electronic resource of the third device linked to the trusted electronic resource of the first device.

21. The network of claim 18 wherein one or more of the devices comprises a computer system.

22. The network of claim 18 wherein one or more of the devices comprises a set-top box.

23. The network of claim 18 wherein one or more of the devices is an electronic personal digital assistant (PDA).

* * * * *